(12) United States Patent
Zhu (10) Patent No.: US 12,362,908 B2
(45) Date of Patent: Jul. 15, 2025

(54) DATA PRIVACY PROTECTION BASED POLAR CODING

(71) Applicant: Nokia Technologies Oy, Espoo (FI)

(72) Inventor: Kai Zhu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 205 days.

(21) Appl. No.: 17/791,248

(22) PCT Filed: Jan. 20, 2020

(86) PCT No.: PCT/CN2020/073300
§ 371 (c)(1),
(2) Date: Jul. 7, 2022

(87) PCT Pub. No.: WO2021/146859
PCT Pub. Date: Jul. 29, 2021

(65) Prior Publication Data
US 2023/0041939 A1    Feb. 9, 2023

(51) Int. Cl.
*H04L 29/06* (2006.01)
*H04L 9/00* (2022.01)
*H04L 9/06* (2006.01)

(52) U.S. Cl.
CPC ............ *H04L 9/0618* (2013.01); *H04L 9/002* (2013.01)

(58) Field of Classification Search
CPC ...... H04L 9/0618; H04L 9/002; H03M 13/63; H03M 13/13
See application file for complete search history.

(56) References Cited

U.S. PATENT DOCUMENTS

| 10,312,947 | B2 | 6/2019 | Ge et al. | |
|---|---|---|---|---|
| 2012/0045056 | A1 | 2/2012 | Takashima et al. | |
| 2014/0208183 | A1 | 7/2014 | Mahdavifar et al. | |
| 2017/0155405 | A1 | 6/2017 | Ge et al. | |
| 2017/0331590 | A1* | 11/2017 | Wu | H03M 13/2792 |
| 2018/0323804 | A1 | 11/2018 | Sadiq et al. | |

(Continued)

FOREIGN PATENT DOCUMENTS

| CN | 110266321 A | 9/2019 |
|---|---|---|
| EP | 3247042 A1 | 11/2017 |

OTHER PUBLICATIONS

Hooshmand, Reza, Mohammad Reza Aref, and Taraneh Eghlidos. "Secret key cryptosystem based on non-systematic polar codes." Wireless Personal Communications 84 (2015): 1345-1373. (Year: 2015).*

(Continued)

*Primary Examiner* — Michael M Lee
(74) *Attorney, Agent, or Firm* — McCarter & English, LLP (57) ABSTRACT

Example embodiments of the present disclosure relate to devices, methods, apparatuses and computer readable storage media for data encryption and decryption. In example embodiments, a first cipher key and a second cipher key are obtained. The first cipher key comprises a vector of cipher elements, and the second cipher key comprises a set of indices corresponding to a subset matrix of a polarizing matrix. A cipher vector is generated by polar coding of a data vector based on the first and second cipher keys and the polarizing matrix. The data and cipher vectors are combined for encryption of the data vector.

15 Claims, 6 Drawing Sheets

(56) References Cited

U.S. PATENT DOCUMENTS

2019/0260398 A1 8/2019 Chaki et al.
2019/0268094 A1* 8/2019 Ge .................. H04L 1/0063

OTHER PUBLICATIONS

Tomaru, "Secret Key Generation from Channel Noise with the Help of a Common Key", arXiv, Mar. 14, 2018, pp. 1-17.
Hooshmand et al., "Efficient Polar Code-Based Physical Layer Encryption Scheme", IEEE Wireless Communications Letters, vol. 6, No. 6, Dec. 2017, pp. 710-713.
Wang et al., "An Optimized Encoding Algorithm for Systematic Polar Codes", EURASIP Journal on Wireless Communications and Networking, Article No. 193, 2019, pp. 1-12.
Arikan, "Channel polarization: A method for constructing capacity-achieving codes", International Symposium on Information Theory, Jul. 6-11, 2008, pp. 1173-1177.
International Search Report and Written Opinion received for corresponding Patent Cooperation Treaty Application No. PCT/CN2020/073300, dated Oct. 26, 2020, 9 pages.
"Discussion on polar codes for NR", 3GPP TSG RAN WG1 #86, R1-166415, Agenda: 8.1.4.1, ZTE, Aug. 22-26, 2016, pp. 1-9.
"Design of Polar code for control channel", 3GPP TSG RAN WG1 Meeting #88bis, R1-1704932, Agenda: 8.1.4.2.1.3, LG Electronics, Apr. 3-7, 2017, 4 pages.
Ma et al., "Research on polar codes about channel polarization, coding and decoding", Journal of Qiqihar University (Natural Science Edition), vol. 32, No. 1, Jan. 2016, pp. 30-35.
Extended European Search Report received for corresponding European Patent Application No. 20915225.5, dated Oct. 13, 2023, 8 pages.
Lu et al., "A Study on Channel Polarization and Polar coding", 9th IEEE International Conference on ASIC, Oct. 25-28, 2011, 4 pages.

* cited by examiner

DATA PRIVACY PROTECTION BASED POLAR CODING

RELATED APPLICATION

This application was originally filed as PCT Application No. PCT/CN2020/073300, filed on Jan. 20, 2020, which is incorporated herein by reference in its entirety.

FIELD

Example embodiments of the present disclosure generally relate to the field of encryption, and in particular, to devices, methods, apparatuses and computer readable storage media for data encryption and decryption.

BACKGROUND

Data security is very important in the digital world. Especially when the fifth generation (5G) wireless system is deployed for industrial scenarios, such as a smart factory, command and control (C&C) signaling needs proper encryption to be immune from a cyber-attack and an unauthorized access. The data conveyed from the sender to recipient may be protected by encryption with ciphers. Conventional encryption algorithms include an advanced encryption standard (AES), a data encryption standard (DES) and the like.

SUMMARY

In general, example embodiments of the present disclosure provide devices, methods, apparatuses and computer readable storage media for data encryption and decryption.

In a first aspect, a device is provided which comprises at least one processor and at least one memory including computer program code. The at least one memory and the computer program code are configured to, with the at least one processor, cause the device to obtain a first cipher key and a second cipher key. The first cipher key comprises a vector of cipher elements, and the second cipher key comprises a set of indices corresponding to a subset matrix of a polarizing matrix. The device is then caused to generate a cipher vector by polar coding of a data vector based on the first and second cipher keys and the polarizing matrix. The device is further caused to combine the data vector and the cipher vector for encryption of the data vector.

In a second aspect, a device is provided which comprises at least one processor and at least one memory including computer program code. The at least one memory and the computer program code are configured to, with the at least one processor, cause the device to obtain a first cipher key and a second cipher key. The first cipher key comprises a vector of cipher elements, and the second cipher key comprises a set of indices corresponding to a subset matrix of a polarizing matrix. The device is then caused to derive a combination of a data vector and a cipher vector by polar decoding of an encrypted data vector based on the first and second cipher keys. The cipher vector is generated by polar coding of the data vector based on the first and second cipher keys and the polarizing matrix. The device is further caused to obtain the data vector from the combination of the data vector and the cipher vector.

In a third aspect, a method of data encryption is provided. In the method, a first cipher key and a second cipher key are obtained. The first cipher key comprises a vector of cipher elements, and the second cipher key comprises a set of indices corresponding to a subset matrix of a polarizing matrix. A cipher vector is generated by polar coding of a data vector based on the first and second cipher keys and the polarizing matrix. The data vector and the cipher vector are combined for encryption of the data vector.

In a fourth aspect, a method of data decryption is provided. In the method, a first cipher key and a second cipher key are obtained. The first cipher key comprises a vector of cipher elements, and the second cipher key comprises a set of indices corresponding to a subset matrix of a polarizing matrix. A combination of a data vector and a cipher vector is derived by polar decoding of an encrypted data vector based on the first and second cipher keys. The cipher vector is generated by polar coding of the data vector based on the first and second cipher keys and the polarizing matrix. The data vector is obtained from the combination of the data vector and the cipher vector.

In a fifth aspect, there is provided an apparatus comprising means for performing the method according to the third or fourth aspect.

In a fourth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "encryptor" refers to any suitable device capable of encrypting data or a part thereof. The term "decryptor" refers to any suitable device capable of decrypting the encrypted data or a part thereof. Examples of the encryptor and decryptor include, but not limited to, personal computers, laptop computers, tablet computers, personal digital assistances, blades, servers, smart phones, laptop-embedded equipment (LEE), laptop-mounted equipment (LME), customer-premises equipment (CPE), sensors, metering devices, personal wearables, and/or vehicles that are capable of computing. Herein, the terms "encoding" and "encryption" can be used interchangeably, and the terms "decoding" and "decryption" can be used interchangeably.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

A polar code has been standardized in 3GPP as an error-control code for the 5G wireless system. The polar code is designed based on the channel polarization theory.

Figure 1:
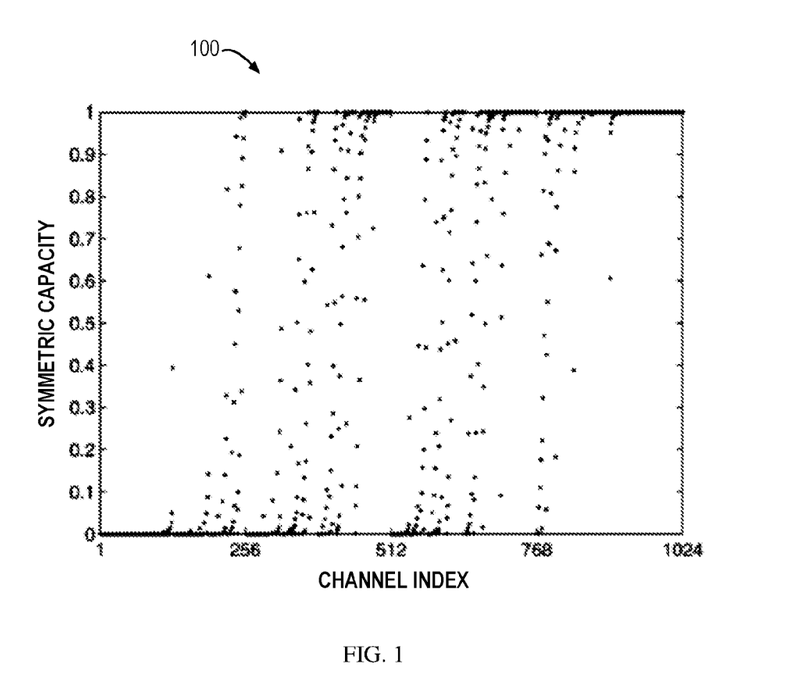
FIG. 1 illustrates an example channel polarization phenomenon.

FIG. 1 shows an example channel polarization phenomenon 100. In this example, after repeated and recursive polarization encoding, the channel is polarized where majority samples of the channel have a symmetric capacity represented by a mutual information value "0" or "1". The mutual information value "1" indicates that the channel is 100% reliable, whereas the mutual information value "0" indicates that the channel is 100% noisy. A few samples as shown in FIG. 1 have a mutual information value between 0 and 1. If the number of samples reaches infinity, the channel polarization phenomenon may be ideal.

Figure 2A:
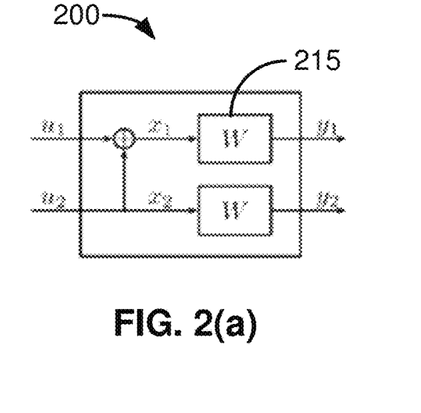
FIGS. 2(a), 2(b) and 2(c) illustrate example polarization encoding structures with one, two and three polarizations, respectively.
Figure 2B:
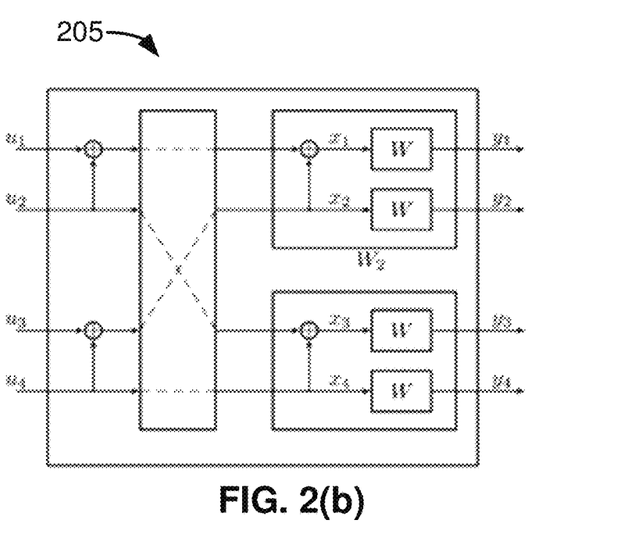
Figure 2C:
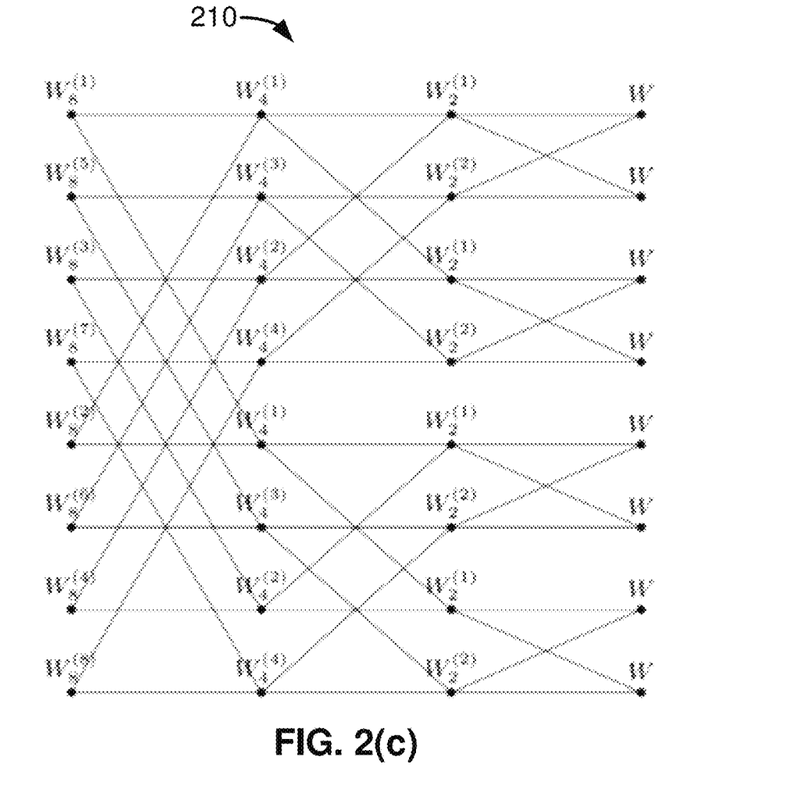

FIGS. 2(a), 2(b) and 2(c) show example polarization encoding structures 200, 205 and 210 with one, two and three polarizations, respectively. A module 215 (denoted by W) represents a channel, $u_i$ represents an input, and $x_i$ represents an output (i=1, 2, ..., N where N is any suitable positive integer). If the inputs $u_i$ and outputs $x_i$ are arranged in the form of vectors u and X, respectively, the recursive polarizations depicted in FIGS. 2(a) to 2(c) can be generalized and expressed by Equation (1) as follows:

$$X = uG, \quad (1)$$

where a polarizing matrix G is Kronecker n-th power of the 2-by-2 matrix $$\begin{bmatrix} 1 & 0 \\ 1 & 1 \end{bmatrix},$$

and X is the polarized version of the input vector u, that is, a vector containing encrypted data.

When the dimension of G exceeds the size of u, a sub-matrix of G is used instead, which is represented by $G_{AA}$. The element from the i-th row, j-th column in $G_{AA}$ is taken from a set A, that is, i∈A, j∈A. The set A represents a set of indices to indicate the locations in a given sequence where the input data bits are carried. The complementary set of A, represented by $\overline{A}$, indicates the indices of rows and columns that are not selected for the sub-matrix $G_{AA}$.

It is proposed to use the polarization theory for data encryption. For example, the encryption and decryption can be achieved equivalently via the encoding and decoding procedures of polar codes. However, conventional encryption approaches rely on matrix transformation and thus are complicated. Proposed encryption and decryption complexities are in the order of O(NlogN), where N is the length of input binary data sequence, O(·) is standard Landau notation.

The inventor finds that the output X of Equation (1) can be viewed as two separate and independent parts as follows:

$$X = [u \ c]. \quad (2)$$

The second part c can be correspondingly formulated by $$c = (u \oplus v G_{\overline{A}A}) G_{AA} G_{A\overline{A}} \oplus v G_{\overline{A}\overline{A}}. \quad (3)$$

Therefore, Equation (1) is equivalent to Equation (2) and Equation (3).

Equation (3) has the following mathematical properties:
1. The term $G_{\overline{A}A}$ is always empty, independent of A and the dimension of G. Hence, Equation (3) can be re-written as follows:

$$c = u G_{AA} G_{A\overline{A}} \oplus v G_{\overline{A}\overline{A}}. \quad (4)$$

2. The vector v may be any arbitrary vector. In other words, the value of the vector v has no impact to the polarization phenomenon.

Example embodiments of the present disclosure propose a novel data encryption scheme based on the polarization theory. The scheme utilizes two or more cipher keys for polar coding of data to provide a multi-cipher security mechanism. Accordingly, the decryption or decoding of the data requires all these cipher keys to be correct. If any of the cipher keys is incorrect, the decryption will be failed. As such, an unauthorized recipient lacking the correct key(s) is unable to decrypt and read the original data.

According to example embodiments of the present disclosure, a cipher key (referred to as a first cipher key) comprises a vector of cipher elements, and a further cipher key (referred to as a second cipher key) comprises a set of indices, such as the set A or $\overline{A}$, corresponding to a subset matrix of a polarizing matrix such as G. In some example embodiments, the set of indices may indicate which cipher elements in the vector of cipher elements are to be used for the encryption and/or decryption of a data vector. For example, the cipher elements with the indices corresponding to the respective indices of the set of indices will be used.

If either the vector of cipher elements or the set of indices is incorrect, the following error cases will occur during the decryption or decoding:
1. An element is extracted from an incorrect vector of cipher elements and has an incorrect location indicated by the corresponding index from an incorrect set of indices.
2. An element is extracted from an incorrect vector of cipher elements, but has a correct location indicated by the corresponding index from a correct set of indices.
3. An element is extracted from a correct vector of cipher elements, but has an incorrect location indicated by the corresponding index from an incorrect set of indices.

In any of the above cases, successful decryption or decoding will be impossible. For example, if an incorrect cipher element is inserted or a cipher element is inserted in an incorrect location indicated by an index of the set of indices, the decoding or decryption will be failed. As such, the multi-cipher security mechanism according to example embodiments of the present disclosure improves data protection and security significantly.

Figure 3:
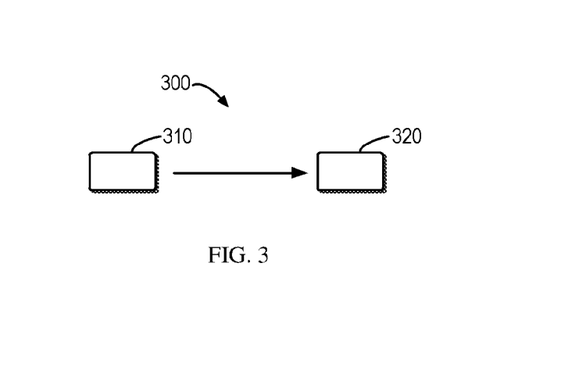
FIG. 3 illustrates an example environment in which example embodiments of the present disclosure can be implemented.

FIG. 3 shows an example environment 300 in which example embodiments of the present disclosure can be implemented.

The environment 300 comprises an encryptor 310 and a decryptor 320. The encryptor 310 and decryptor 320 can be implemented by any suitable device having the function of data encryption and decryption. The encryptor 310 can convey data to the decryptor 320 in a wireless or wired way. The data convey may follow any suitable wireless and/or wired communication standards or protocols and employ any suitable wireless and/or wired communication technologies.

In various example embodiments of the present disclosure, the data convey from the encryptor 310 to the decryptor 320 uses the polarization theory. Specifically, the encryptor 310 uses at least two cipher keys to perform polar coding on the data to generate a cipher for data encryption. Accordingly, the decryptor 320 uses these cipher keys for data decryption. The recipient without either of the correct cipher keys will fail to decrypt the data.

Figure 4:
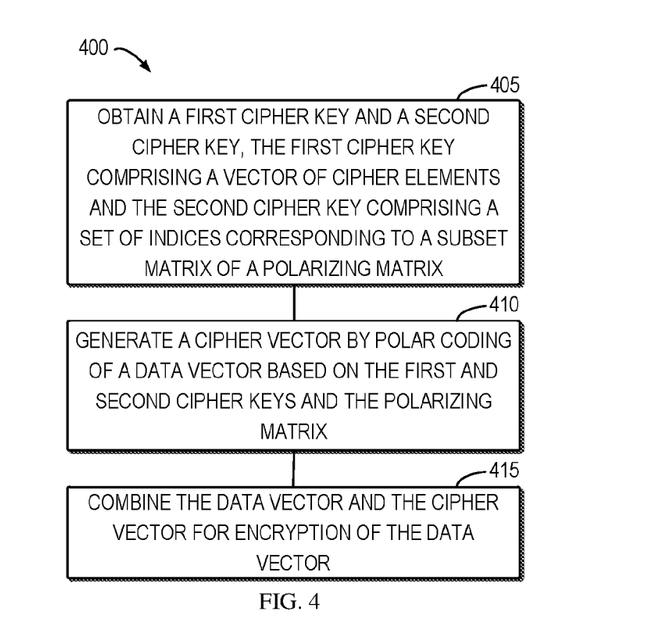
FIG. 4 illustrates a flowchart of an example method of data encryption according to some example embodiments of the present disclosure.

FIG. 4 shows a flowchart of an example method 400 of data encryption according to some example embodiments of the present disclosure. The method 400 can be implemented by the encryptor 310 as shown in FIG. 3. For the purpose of discussion, the method 400 will be described with reference to FIG. 3.

At block 405, the encryptor 310 obtains at least two cipher keys, referred to as a first cipher key and a second cipher key, respectively. The first cipher key comprises a vector of cipher elements, and the second cipher key comprises a set of indices corresponding to a subset matrix of a polarizing matrix such as G. In some example embodiments, the first cipher key may be implemented by an arbitrary vector v, and the second cipher key may be implemented by the set A or $\overline{A}$.

The cipher keys may obtained by the encryptor 310 in any suitable way. In some example embodiments, one or two of the cipher keys may be predefined or predetermined. For example, the cipher key(s) may be burnt into firmware of the encryptor 310 and the decryptor 320 by a manufacturer. The burnt cipher key(s) may be unique for each individual pair of an encryptor and a decryptor. This provides the data protection and security in a firmware level. A third-party recipient has no way to intercept and decode the encrypted information.

In some example embodiments, one or two of the cipher keys may be dynamically configured, for example, by a system administrator. For example, the cipher key(s) may be physically included in a code book and configured by an authorized system administrator. The configured cipher key(s) may be changed from time to time to improve the data security.

In some example embodiments, the two cipher keys may be configured in different manners to minimize the likelihood of security breach. For example, one cipher key may be burnt into the firmware of the encryptor 310 and decryptor 320 to provide a first level of security from the firmware level. The other cipher key may be included in a configured code book such that this cipher key can be changed regularly to provide a further level of security.

In some example embodiments, the encryptor 310 may randomly select one or two cipher keys for data encryption to further improve the data security. In this case, the encryptor 310 may indicate or transfer the selected cipher key(s) to the decryptor 320 via secure means (either a secure off-line transfer channel or a secure online transfer channel) for data decryption.

After the cipher keys are obtained, at block 410, the encryptor 310 generates a cipher vector by polar coding of a data vector based on the polarizing matrix and at least the first and second cipher keys. Any suitable polar coding algorithms may be applied herein. In the example embodiments where the first cipher key is implemented by the vector v, and the set of indices is implemented by the information set A or $\overline{A}$, Equation (4) may be used for the polar coding of the data vector u, and the cipher vector is generated as c. It is also possible to use Equation (3) or any other polar coding algorithms.

In some example embodiments, the encryptor 310 may generate a sub-vector of cipher elements from the vector of cipher elements to further improve the data privacy protection. The sub-vector of cipher elements may be randomly selected by the encryptor 310.

Alternatively, the sub-vector of cipher elements may be selected based on the set of indices as the second cipher key. For example, the set of indices may indicate which cipher elements in the vector of cipher elements are to be used for the encryption and decryption. Accordingly, an index of a cipher element of the sub-vector corresponds to an index of the set of indices. In this case, the insertion of an incorrect element into the sub-vector or the insertion of an element with an incorrect index into the sub-vector will cause failed decryption. As such, the data security may be improved significantly.

At block 415, the encryptor 310 combines the data vector and the generated cipher vector for encryption of the data vector. The data and cipher vectors may be combined in any suitable way. For example, the encryptor 310 may use Equation (2) for concatenating the data and cipher vectors. As another example, the data and cipher vectors may be interleaved by the encryptor 310 according to a rule. Accordingly, the encryptor 310 may indicate or transfer the rule to the decryptor 320 for data decryption.

According to example embodiments of the present disclosure, the encryptor 310 employs at least two cipher keys during the encryption of the data. In order to successfully decode the encrypted data, all of the cipher keys are needed at recipient side. Incorrectness of any key would lead to decryption failure. Only when all keys are correct, the encrypted data can be correctly decrypted.

Figure 5:
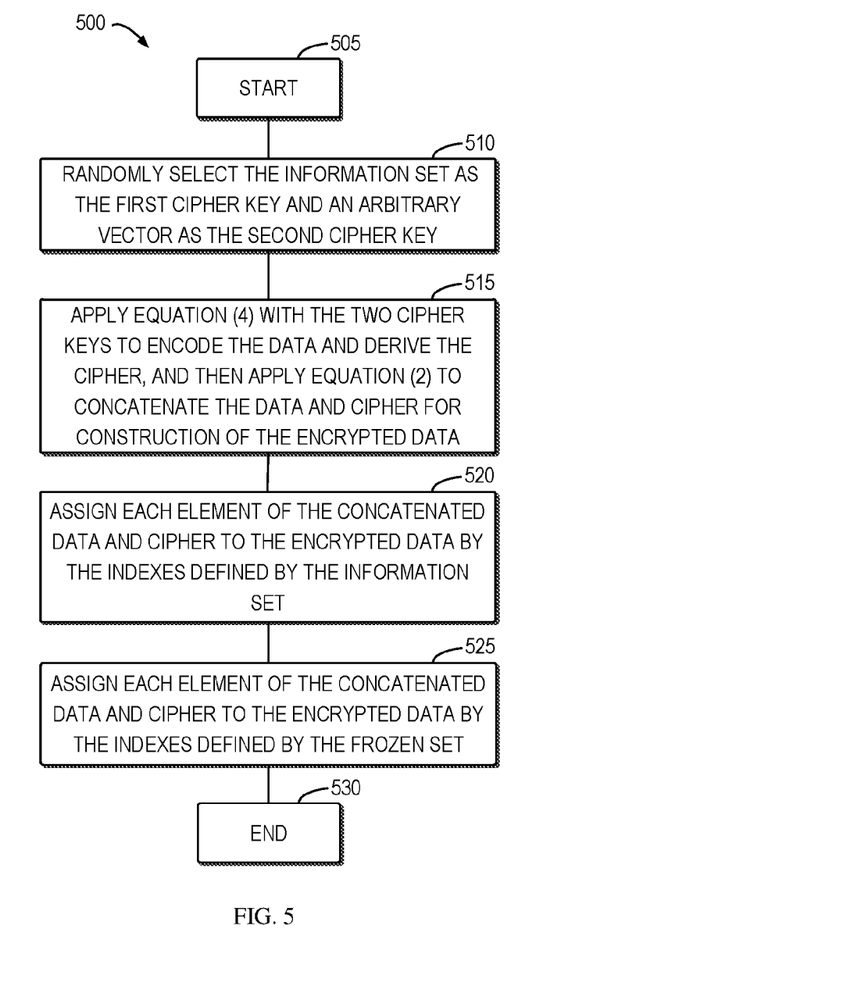
FIG. 5 illustrates a flowchart of an example method of data encryption according to some other example embodiments of the present disclosure.

FIG. 5 shows a flowchart of an example process 500 according to some example embodiments of the present disclosure. The process 500 can be an example implementation of the method 400 as shown in FIG. 4. For the purpose of discussion, the process 500 will be described with reference to FIG. 3.

After the process 500 starts at block 505, at block 510, the encryptor 310 randomly selects the set A as the second cipher key and an arbitrary vector v as the first cipher key. At block 515, the encryptor 310 applies Equation (4) with the two cipher keys A and v to encode the data vector (expressed as the vector u) and derive the cipher vector c, and then applies Equation (2) to concatenate u and c for construction of the encrypted data vector (expressed as the vector X). At block 520, the encryptor 310 assigns each element of the concatenated u and c to X by the indices defined by A. At block 525, the encryptor 310 assigns each element of the concatenated u and c to X by the indices defined by the frozen set A. It is also possible that the assignments at blocks 520 and 525 are performed before the concatenation of u and c. Then, the method 500 ends at block 530.

At the recipient side, the encrypted data is distorted by communication media and corrupted by noise. The decryptor 320 may use any suitable decoding approach existing or to be developed in the future to decrypt the data.

Figure 6:
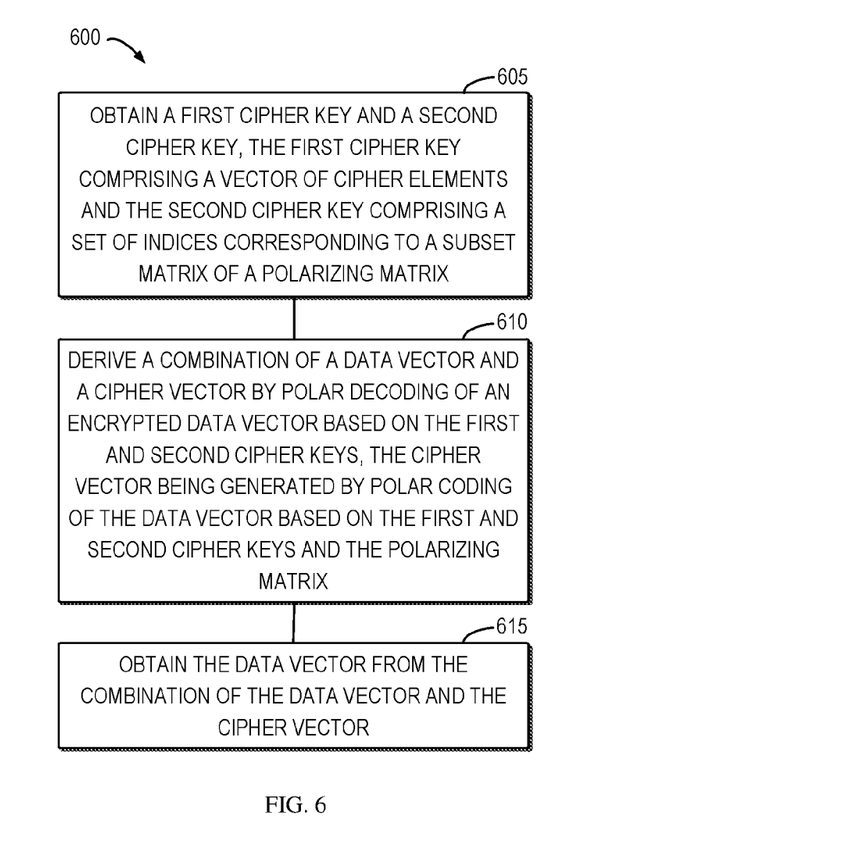
FIG. 6 illustrates a flowchart of an example method of data decryption according to some example embodiments of the present disclosure.

FIG. 6 shows a flowchart of an example method 600 of data decryption according to some example embodiments of the present disclosure. The method 600 can be implemented by the decryptor 320 as shown in FIG. 3. For the purpose of discussion, the method 600 will be described with reference to FIG. 3.

At block 605, the decryptor 320 obtains the first and second cipher keys. The first cipher key comprises a vector of cipher elements, and the second cipher key comprises a set of indices corresponding to a subset matrix of a polarizing matrix such as G. The cipher keys may be obtained by the decryptor 320 in any suitable way. For example, in the example embodiments where one or two of the cipher keys may be predefined or predetermined, the decryptor 320 may know the cipher key(s) in advance. As another example, the cipher key(s) may be dynamically configured by a system administrator, for example. Alternatively or in addition, the cipher key(s) may be received from the encryptor 310.

At block 610, the decryptor 320 derives a combination of a data vector and a cipher vector by polar decoding of an encrypted data vector based on the first and second cipher keys. The cipher vector is generated at the encryptor 310 by polar coding of the data vector based on the first and second cipher keys and the polarizing matrix. The combination of the data and cipher vectors may be implemented by a concatenation of the data and cipher vectors, interleaving of the data and cipher vectors and any other combination forms.

At block 615, the decryptor 320 obtains the data vector from the combination of the data and cipher vectors. The recovery of the data vector may be implemented based on the combination form used by the encryptor 310. In the example embodiments where the data and cipher vectors are interleaved by the encryptor 310 in a certain rule, the decryptor 320 may receive the rule from the encryptor 310 and derive the data vector from the interleaved data and cipher vectors using the rule.

As an example, the decryptor 320 may employ successive cancellation polar decoding during the data decryption. An example process of the successive cancellation polar decoding will be discussed below.

It is assumed that the gabbled and distorted version of X at the recipient side is denoted as y, and $y_1^N$ denotes the vector y of length $N=2^n$. It is further assumed that $a_i^j$ denotes a sub-vector $(a_i \ldots a_j)$ where $a_i$ is regarded as void when $j<i$, $a_{i,e}^j$ denotes a sub-vector $(a_i \ldots a_j)$ where only elements with even indices are selected, and $a_{i,o}^j$ denotes a sub-vector $(a_i \ldots a_j)$ where only elements with odd indices are selected. Moreover, the decrypted version of u is denoted as û.

Decryption of y can be viewed as a type of successive cancelation performed in recursive way to recover $\hat{u}_1^i$ based on $y_1^N$ and $\hat{u}_1^{i-1}$. The essential part is to calculate the likelihood ratio (LR). LR is a type of conditional probability. Starting from the simplest case as shown in FIG. 2(a), if the module 215 (denoted by W) is treated as a black box and the transition probability is used to define the relationship between an input and an output of W, the conditional probability for the outputs $y_1$, $y_2$ can be written as follows:

For $y_1$, $$f(y_1, y_2|u_1) = \sum_{u'_2 \in \text{any valid } u_2} \frac{1}{2} W(y_1|u_1 \oplus u'_2) W(y_2|u'_2) \quad (5)$$

For $y_2$, $$f(y_1, y_2, u_1|u_2) = \frac{1}{2} W(y_1|u_1 \oplus u_2) W(y_2|u_2) \quad (6)$$

FIGS. 2(b) and 2(c) illustrate the scenarios where the polarization is applied repeatedly and recursively. These scenarios can be formulated by extending Equations (5) and (6) to any $n \geq 0$, $N=2^n$, $1 \leq i \leq N$ case as follows, For an odd indexed bit, $$W_{2N}^{(2i-1)}(y_1^{2N}, u_1^{2i-2}|u_{2i-1}) = \quad (7)$$
$$\sum_{u_{2i}} \frac{1}{2} W_N^{(i)}(y_1^N, u_{1,o}^{2i-2} \oplus u_{1,e}^{2i-2}|u_{2i-1} \oplus u_{2i}) \cdot W_N^{(i)}(y_{N+1}^{2N}, u_{1,e}^{2i-2}|u_{2i})$$

For an even indexed bit, $$W_{2N}^{(2i)}(y_1^{2N}, u_1^{2i-1}|u_{2i}) = \qquad (8)$$

$$\frac{1}{2} W_N^{(i)}(y_1^N, u_{1,e}^{2i-2} \oplus u_{1,e}^{2i-2}|u_{2i-1} \oplus u_{2i}) \cdot W_N^{(i)}(y_{N+1}^{2N}, u_{1,e}^{2i-2}|u_{2i}).$$

The decryption process is carried out using the first and second cipher keys from the first bit to the last bit in a successive manner. For example, during the decryption of the i-th bit, the decryptor 320 observes the received y and the previously decrypted information bits $\hat{u}_1^{i-1}$ and generates an estimate $\hat{u}_i$. The decryptor 320 may be considered to consist of N decision elements (DEs), each for a source element $u_i$. These DEs are activated in the order 1 to N. If $i \in \overline{A}$, the element $u_i$ is known. Accordingly, in the example embodiments where the first cipher key is implemented by the vector v and the second cipher key is implemented by the set $\overline{A}$, when the i-th DE is activated, the i-th DE searches the vector $\overline{A}$ for the index f such that $\overline{A}(f)==i$. Then, the i-th DE simply sets $\hat{u}_i = v(f)$ and sends this result to all succeeding DEs. If $i \in A$, the i-th DE waits until it has received the previous decisions $\hat{u}_1^{i-1}$. Upon the reception, the i-th DE calculates the likelihood ratio (LR) as follows:

$$L_N^{(i)}(y_1^N, \hat{u}_1^{i-1}) \triangleq \frac{W_N^{(i)}(y_1^N, \hat{u}_1^{i-1}|0)}{W_N^{(i)}(y_1^N, \hat{u}_1^{i-1}|1)} \qquad (9)$$

The i-th DE generates its decision as:

$$\hat{u}_i = \begin{cases} 0, & \text{if } L_N^{(i)}(y_1^N, \hat{u}_1^{i-1}) \geq 1 \\ 1, & \text{otherwise} \end{cases} \qquad (10)$$

The decision is then sent to all succeeding DEs. This is a single-pass algorithm with no revision of estimates. The complexity of this algorithm is determined essentially by the complexity of calculating the LRs, which is O(NlogN) expressed in standard Landau notation.

A straightforward calculation using the recursive formulas (7) and (8) is given as follows: For an odd indexed bit, $$L_N^{(2i-1)}(y_1^N, \hat{u}_1^{2i-2}) = \frac{L_{N/2}^{(i)}(y_1^{N/2}, \hat{u}_{1,o}^{2i-2} \oplus \hat{u}_{1,e}^{2i-2}) L_{N/2}^{(i)}(y_{N/2+1}^N, \hat{u}_{1,e}^{2i-2}) + 1}{L_{N/2}^{(i)}(y_1^{N/2}, \hat{u}_{1,o}^{2i-2} \oplus \hat{u}_{1,e}^{2i-2}) + L_{N/2}^{(i)}(y_{N/2+1}^N, \hat{u}_{1,e}^{2i-2})} \qquad (11)$$

For an even indexed bit, $$L_N^{(2i)}(y_1^N, \hat{u}_1^{2i-1}) = \left[L_{N/2}^{(i)}(y_1^{N/2}, \hat{u}_{1,o}^{2i-2} \oplus \hat{u}_{1,e}^{2i-2})\right]^{1-2\hat{u}_{2i-1}} \cdot L_{N/2}^{(i)}(y_{N/2+1}^N, \hat{u}_{1,e}^{2i-2}) \qquad (12)$$

The calculation of an LR at length N is reduced to the calculation of two LRs at length N/2. This recursion can be continued down to block length 1, at which point LRs have the form $$L_1^{(1)}(y_i) = \frac{W(y_i|0)}{W(y_i|1)},$$

which can be calculated directly.

All operations and features at the encryptor 310 as described above with reference to FIGS. 3-5 are likewise applicable to the decryptor 320 and have similar effects. For the purpose of simplification, the details will be omitted.

Figure 7:
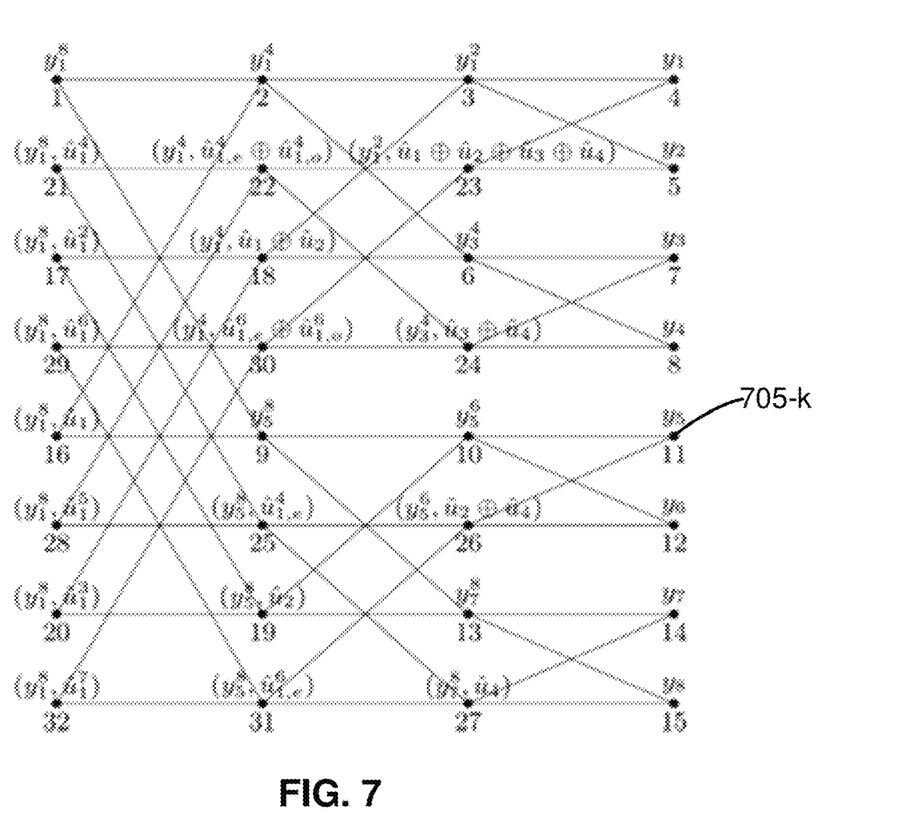
FIG. 7 illustrates an example decryption process using depth-first algorithm according to some example embodiments of the present disclosure.

FIG. 7 shows an example decryption process 700 using depth-first algorithm according to some example embodiments of the present disclosure. As shown, each node 705-K (K=1,2, . . . , 32) represents a DE of the decryptor 320, and the number K indicates the order of the DE to be activated.

According to example embodiments of the present disclosure, only if the decryptor 320 is aware of the two or more cipher keys, the decryptor 320 can correctly decrypt the data. For example, in the example embodiments where the first cipher key is a set of cipher elements and the second cipher key is a set of indices to indicate which cipher elements in the set of cipher elements are to be used for the data encryption, the decryptor 320 needs to know the correct index of the correct cipher element used for the data encryption.

The decryption process is performed in a successive manner, which means that the decision of a current bit value depends on the decoding result of the previous one. Moreover, the term "successive" also means that each bit is processed in a successive order. Once a bit is visited, the bit will never be (re)-visited again. In other words, the decryption procedure is sequential, meaning that it is a one-pass process. Once a bit is decrypted (even if the result is erroneous), there is no chance to look back again. Accordingly, if a decision error occurs, it cannot be corrected. These characteristics are shown mathematically in Equations (5)~(12). As a result, the correct decryption is only possible when both the cipher keys are legitimate. Otherwise, even when a single decision mistake occurs, the entire data is compromised as there is no way to rectify the erroneously decrypted bit. Even a single bit mistake would inevitably lead to catastrophic decoding/decryption outcome.

For exhaustive search attacks, an active attacker typically may consistently checks all possible keys in the key space until he or she succeeds in finding the intended (correct) key. With the presented scheme, assuming the original binary data to be conveyed has length of $\varphi 1$, the encrypted binary data ready for transmission has length of $\varphi 2$, encryption overhead can be formulated as $$\rho = \frac{\varphi 2 - \varphi 1}{\varphi 2}.$$

For example, $\varphi 2 = 1024$ bit, $\rho = 1/3$. The dimension of the set $\overline{A}$ is 341 bits. Therefore, the total number of combinations is $2^{341}$. Moreover, every element from the set $\overline{A}$ must be inserted in the right place during decryption. This 341-bit length overhead could be scattered and located at any combinations of possible locations among 1024 bits, that $$\binom{\varphi 2}{\varphi 2 - \varphi 1} = \frac{1024!}{341! * 683!} * \binom{\varphi 2}{\varphi 2 - \varphi 1}.$$

Thus, the overall number of attempts in the worst-case scenario should is be at least $2^{\varphi 2 - \varphi 1} * (_{\varphi 2 - \varphi 1}{}^{\varphi 2})$. This number is astronomical, and hence the attack is infeasible.

Message-resend attacks and the chosen plaintext attacks can be easily circumvented by careful design of an overall system mechanism. For example, using different information sets A for the initial transmission and the first retransmission, the message-resend attack may be circumvented.

Figure 8:
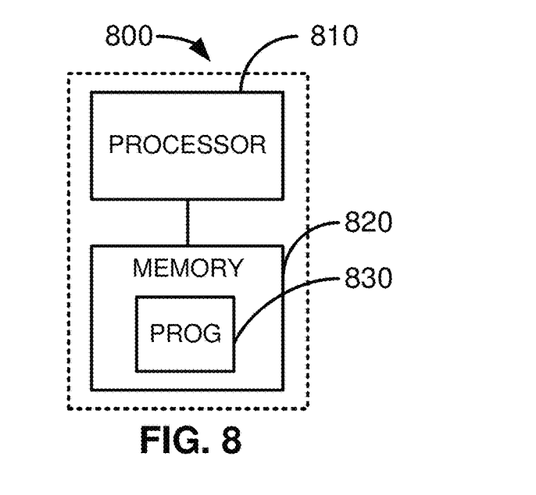
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 can be implemented by the encryptor 310 or include the encryptor 310, or be implemented by the decryptor 320 or include the decryptor 320.

As shown, the device 800 includes a processor 810 and a memory 820 coupled to the processor 810. The memory 820 stores at least a program 830 which is assumed to include program instructions that, when executed by the associated processor 810, enable the device 800 to operate in accordance with the example embodiments of the present disclosure, as discussed herein with reference to FIGS. 3-7. The example embodiments herein may be implemented by computer software executable by the processor 810 of the device 800, or by hardware, or by a combination of software and hardware. The processor 810 may be configured to implement various example embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 acts as the encryptor 310 or includes the encryptor 310, the processor 810 may implement the methods 400 and 500 as described above with reference to FIGS. 3-5. When the device 800 acts as the decryptor 320 or includes the decryptor 320, the processor 810 may implement the method 600 as described above with reference to FIGS. 6-7. All operations and features as described above with reference to FIGS. 3-7 are likewise applicable to the device 700 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400, 500 and 600 as described above with reference to FIGS. 3-7. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: obtain a first cipher key and a second cipher key, the first cipher key comprising a vector of cipher elements and the second cipher key comprising a set of indices corresponding to a subset matrix of a polarizing matrix; generate a vector cipher by polar coding of a data vector based on the first and second cipher keys and the polarizing matrix; and combine the data vector and the cipher vector for encryption of the data vector.

In some example embodiments, the device is caused to combine the data vector and the cipher vector by: concatenating the data vector and the cipher vector.

In some example embodiments, the device is caused to generate the cipher vector by: generating a sub-vector of cipher elements from the vector of cipher elements based on the set of indices, a cipher element of the sub-vector having an index corresponding to an index of the set of indices in the vector of cipher elements; and performing the polar coding of the data using the polarizing matrix, the set of indices and the sub-vector of cipher elements to generate the cipher vector.

In some example embodiments, at least one of the first and second cipher keys is dynamically configured or randomly selected.

In some example embodiments, a device comprises: at least one processor; and at least one memory including computer program code; the at least one memory and the computer program code configured to, with the at least one processor, cause the device to: obtain a first cipher key and a second cipher key, the first cipher key comprising a vector of cipher elements and the second cipher key comprising a set of indices corresponding to a subset matrix of a polarizing matrix; derive a combination of a data vector and a cipher vector by polar decoding of an encrypted data vector based on the first and second cipher keys, the cipher vector being generated by polar coding of the data vector based on the first and second cipher keys and the polarizing matrix; obtain the data vector from the combination of the data vector and the cipher vector.

In some example embodiments, the combination of the data vector and the cipher vector comprises a concatenation of the data vector and the cipher vector.

In some example embodiments, the device is caused to derive the combination of the data vector and the cipher vector by: generating a sub-vector of cipher elements from the vector of cipher elements based on the set of indices, a cipher element of the sub-vector having an index corresponding to an index of the set of indices in the vector of cipher elements; and performing the polar decoding of the encrypted data using the set of indices and the sub-vector of cipher elements to derive the combination of the data vector and the cipher vector.

In some aspects, a method of data encryption comprises: obtaining a first cipher key and a second cipher key, the first cipher key comprising a vector of cipher elements and the second cipher key comprising a set of indices corresponding to a subset matrix of a polarizing matrix; generating a cipher vector by polar coding of a data vector based on the first and second cipher keys; and combining the data vector and the cipher vector for encryption of the data vector.

In some example embodiments, combining the data vector and the cipher vector comprises concatenating the data vector and the cipher vector.

In some example embodiments, generating the cipher vector comprises: generating a sub-vector of cipher elements from the vector of cipher elements based on the set of indices, a cipher element of the sub-vector having an index corresponding to an index of the set of indices in the vector of cipher elements; and performing the polar coding of the data vector using the polarizing matrix, the set of indices and the sub-vector of cipher elements to generate the cipher vector.

In some example embodiments, at least one of the first and second cipher keys is dynamically configured or randomly selected.

In some aspects, a method of data decryption comprises: obtaining a first cipher key and a second cipher key, the first cipher key comprising a vector of cipher elements and the second cipher key comprising a set of indices corresponding to a subset matrix of a polarizing matrix; deriving a combination of a data vector and a cipher vector by polar decoding of an encrypted data vector based on the first and second cipher keys, the cipher vector being generated by polar coding of the data vector based on the first and second cipher keys and the polarizing matrix; and obtaining the data vector from the combination of the data vector and the cipher vector.

In some example embodiments, the combination of the data vector and the cipher vector comprises a concatenation of the data vector and the cipher vector.

In some example embodiments, deriving the combination of the data vector and the cipher vector comprises: generating a sub-vector of cipher elements from the vector of cipher elements based on the set of indices, a cipher element of the sub-vector having an index corresponding to an index of the set of indices in the vector of cipher elements; and performing the polar decoding of the encrypted data using the set of indices and the sub-vector of cipher elements to derive the combination of the data vector and the cipher vector.

In some aspects, an apparatus of data decryption comprises: means for obtaining a first cipher key and a second cipher key, the first cipher key comprising a vector of cipher elements and the second cipher key comprising a set of indices corresponding to a subset matrix of a polarizing matrix; means for generating a cipher vector by polar coding of a data vector based on the first and second cipher keys and the polarizing matrix; and means for concatenating the data vector and the cipher vector for encryption of the data vector.

In some example embodiments, means for combining the data vector and the cipher vector comprises means for concatenating the data vector and the cipher vector.

In some example embodiments, the means for generating the cipher vector comprises: means for generating a sub-vector of cipher elements from the vector of cipher elements based on the set of indices, a cipher element of the sub-vector having an index corresponding to an index of the set of indices in the vector of cipher elements; and means for performing the polar coding of the data using the polarizing matrix, the set of indices and the selected subset of cipher elements to generate the cipher vector.

In some example embodiments, at least one of the first and second cipher keys is dynamically configured or randomly selected.

In some aspects, an apparatus of data decryption comprises: means for obtaining a first cipher key and a second cipher key, the first cipher key comprising a vector of cipher elements and the second cipher key comprising a set of indices corresponding to a subset matrix of a polarizing matrix; means for deriving a combination of a data vector and a cipher vector by polar decoding of an encrypted data vector based on the first and second cipher keys, the cipher vector being generated by polar coding of the data vector based on the first and second cipher keys and the polarizing matrix; and means for obtaining the data vector from the combination of the data vector and the cipher vector.

In some example embodiments, the combination of the data vector and the cipher vector comprises a concatenation of the data vector and the cipher vector.

In some example embodiments, the means for deriving the combination of the data vector and the cipher vector comprises: means for generating a sub-vector of cipher elements from the vector of cipher elements based on the set of indices, a cipher element of the sub-vector having an index corresponding to an index of the set of indices in the vector of cipher elements; and means for performing the polar decoding of the encrypted data using the set of indices and the sub-vector of cipher elements to derive the combination of the data vector and the cipher vector.

In some aspects, a computer readable storage medium comprises program instructions stored thereon, the instructions, when executed by a processor of a device, causing the device to perform the method according to some example embodiments of the present disclosure.

What is claimed is:

1. A device for data encryption of a data vector, comprising:
    at least one processor; and
    at least one memory storing instructions that, when executed by the at least one processor, cause the device to perform at least the following:
    obtaining a first cipher key and a second cipher key, the first cipher key comprising a vector of cipher elements and the second cipher key comprising a set of first indices corresponding to a subset matrix comprising selected elements based on the first indices of a polarizing matrix;
    generating a cipher vector by polar coding of the data vector based on the first cipher key and multiple versions of the second cipher key, wherein the multiple versions of the second cipher key comprise a first version based on the first indices, a second version based on a complementary set of second indices not in the first indies, and a third version based on both the first and second indices; and
    concatenating the data vector and the cipher vector for encryption of the data vector.

2. The device of claim 1, wherein:
    the first cipher key comprises a vector v of cipher elements and the second cipher key comprises the first version having a set of indices A corresponding to a subset matrix $G_{AA}$ comprising the selected elements of a polarizing matrix G, the second version having a complementary set of A, denoted as $\bar{A}$, corresponding to indices of rows and columns not selected from the polarizing matrix G for a subset matrix $G_{\bar{A}\bar{A}}$, and the third version having the set of indices A and $\bar{A}$ for a subset matrix $G_{A\bar{A}}$ corresponding to indices of rows and columns both selected, as indices A, and not selected, as indices $\bar{A}$, from the polarizing matrix G;
    generating the cipher vector comprises generating the cipher vector by the polar coding of the data vector based on the first and second cipher keys and the polarizing matrix, according to the following:

$$c = uG_{AA}G_{A\bar{A}} \oplus vG_{\bar{A}\bar{A}}$$

where c is the cipher vector, u represents the data vector, and v is the vector of cipher elements; and
    concatenating the data vector and the cipher vector for encryption of the data vector comprises performing X=[uc], where X is the encryption of the data vector based on the cipher vector.

3. The device of claim 2, wherein the vector v of cipher elements is any arbitrary vector.

4. The device of claim 1, wherein the polarizing matrix has a dimension that exceeds a size of the data vector, and the obtaining the second cipher key is performed when the polarizing matrix has the dimension that exceeds the size of the data vector.

5. The device of claim 4, wherein the polarizing matrix is a Kronecker n-th power of a two-by-two matrix.

6. A device for decryption of an encrypted data vector, comprising:
    at least one processor; and
    at least one memory storing instructions that, when executed by the at least one processor, cause the device to perform at least the following:
    obtaining a first cipher key and a second cipher key, the first cipher key comprising a vector of cipher elements and the second cipher key comprising a set of first indices corresponding to a subset matrix comprising selected elements based on the first indices of a polarizing matrix;
    deriving a combination of a data vector and a cipher vector by polar decoding of the encrypted data vector based on the first cipher key and multiple versions of the second cipher key, wherein the multiple versions of the second cipher key comprise a first version based on the first indices, a second version based on a complementary set of second indices not in the first indices and a third version based on both the first and second indices, the cipher vector being generated by polar coding of the data vector based on the first cipher key and the multiple versions of the second cipher key; and
    obtaining the data vector from the combination of the data vector and the cipher vector.

7. The device of claim 6, wherein:
    the first cipher key comprises a vector v of cipher elements and the second cipher key comprises the first version having a set of indices A corresponding to a subset matrix $G_{AA}$ comprising the selected elements of a polarizing matrix G, the second version having a complementary set of A, denoted as $\bar{A}$, corresponding to indices of rows and columns not selected from the polarizing matrix G for a subset matrix $G_{\bar{A}\bar{A}}$, and the third version having the set of indices A and $\bar{A}$ for a subset matrix $G_{A\bar{A}}$ corresponding to indices of rows and columns both selected, as indices A, and not selected, as indices $\bar{A}$, from the polarizing matrix G;
    generating the cipher vector comprises generating the cipher vector by the polar coding of the data vector based on the first and second cipher keys and the polarizing matrix, according to the following:

$$c = uG_{AA}G_{A\overline{A}} \oplus vG_{\overline{A}\overline{A}}$$

where c is the cipher vector, u represents the data vector, and v is the vector of cipher elements; and concatenating the data vector and the cipher vector for encryption of the data vector comprises performing X=[uc], where X is the encryption of the data vector based on the cipher vector.

8. The device of claim 7, wherein the vector v of cipher elements is any arbitrary vector.

9. The device of claim 6, wherein the polarizing matrix has a dimension that exceeds a size of the data vector, and the obtaining the second cipher key is performed when the polarizing matrix has the dimension that exceeds the size of the data vector.

10. The device of claim 9, wherein the polarizing matrix is a Kronecker n-th power of a two-by-two matrix.

11. A method of data encryption of a data vector, comprising:
obtaining a first cipher key and a second cipher key, the first cipher key comprising a vector of cipher elements and the second cipher key comprising a set of first indices corresponding to a subset matrix comprising selected elements based on the first indices of a polarizing matrix;
generating a cipher vector by polar coding of the data vector based on the first cipher key and multiple versions of the second cipher key, wherein the multiple versions of the second cipher key comprise a first version based on the first indices, a second version based on a complementary set of second indices not in the first indices, and a third version based on both the first and second indices; and
concatenating the data vector and the cipher vector for encryption of the data vector.

12. The method of claim 11, wherein:
the first cipher key comprises a vector v of cipher elements and the second cipher key comprises the first version having a set of indices A corresponding to a subset matrix $G_{AA}$ comprising the selected elements of a polarizing matrix G, the second version having a complementary set of A, denoted as $\overline{A}$, corresponding to indices of rows and columns not selected from the polarizing matrix G for a subset matrix $G_{\overline{A}\overline{A}}$, and the third version having the set of indices A and $\overline{A}$ for a subset matrix $G_{A\overline{A}}$ corresponding to indices of rows and columns both selected, as indices A, and not selected, as indices $\overline{A}$, from the polarizing matrix G;
generating the cipher vector comprises generating the cipher vector by the polar coding of the data vector based on the first and second cipher keys and the polarizing matrix, according to the following:

$$c = uG_{AA}G_{A\overline{A}} \oplus vG_{\overline{A}\overline{A}}$$

where c is the cipher vector, u represents the data vector, and v is the vector of cipher elements; and concatenating the data vector and the cipher vector for encryption of the data vector comprises performing X=[uc], where X is the encryption of the data vector based on the cipher vector.

13. The method of claim 12, wherein the vector v of cipher elements is any arbitrary vector.

14. The method of claim 11, wherein the polarizing matrix has a dimension that exceeds a size of the data vector, and the obtaining the second cipher key is performed when the polarizing matrix has the dimension that exceeds the size of the data vector.

15. The method of claim 14, wherein the polarizing matrix is a Kronecker n-th power of a two-by-two matrix.

* * * * *